(12) United States Patent
Emmerink et al.

(10) Patent No.: US 6,216,085 B1
(45) Date of Patent: Apr. 10, 2001

(54) NAVIGATION SYSTEM FOR A VEHICLE

(75) Inventors: Carla J. M. Emmerink; Edwin W. Mulder; Erik J. Walgers; Paul D. M. E. Lahaije, all of Eindhoven (NL)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/143,836

(22) Filed: Aug. 31, 1998

(30) Foreign Application Priority Data

Sep. 3, 1997 (EP) .................................................. 97202713

(51) Int. Cl.[7] ........................................................ G06F 17/00
(52) U.S. Cl. ............................ 701/117; 340/905; 701/210
(58) Field of Search .................................... 701/117, 118, 701/200, 204, 208, 209, 210; 340/905, 439, 990, 995; 455/186.1

(56) References Cited

U.S. PATENT DOCUMENTS

| 5,095,532 | | 3/1992 | Mardus | 455/186.1 |
| 5,182,555 | * | 1/1993 | Sumner | 340/905 |
| 5,537,323 | | 7/1996 | Schulte | 701/211 |
| 5,699,056 | * | 12/1997 | Yoshida | 340/905 |

* cited by examiner

*Primary Examiner*—William A. Cuchlinski, Jr.
*Assistant Examiner*—Edward Pipala
(74) *Attorney, Agent, or Firm*—Mayer, Brown & Platt

(57) ABSTRACT

A navigation system (100) guiding a driver of a vehicle has a receiver (102) for the reception of traffic message. The navigation system has a filter module (104) that determines the delay caused by the event of the received traffic message. The filter module only transfers the traffic message to the process module (106) of the navigation system if the delay is larger than a threshold (108).

8 Claims, 1 Drawing Sheet

NAVIGATION SYSTEM FOR A VEHICLE

FIELD OF THE INVENTION

Figure 1:
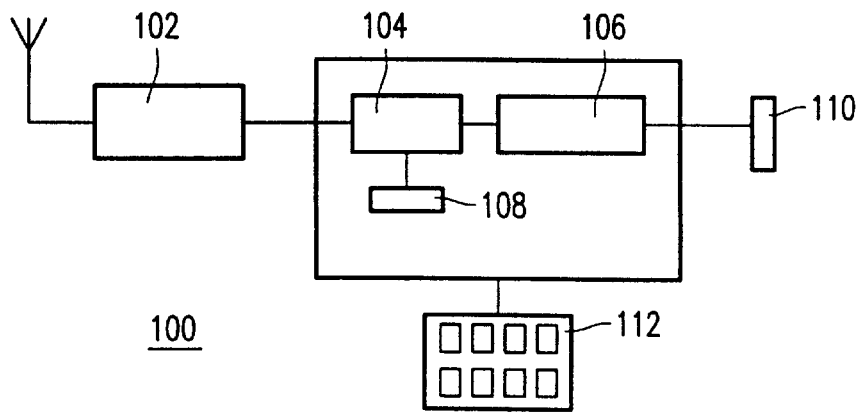

The invention relates to a navigation system for guiding a driver of a vehicle, the navigation system comprising:
- a receiver for the reception of a traffic message, the traffic message comprising an event and a location to which the event relates,
- a filter module for evaluating the traffic message and for deciding whether the traffic message is to be processed, and
- a process module for processing and exploiting the traffic message.

BACKGROUND OF THE INVENTION

The invention further relates to a method of giving guidance information to a driver of a vehicle, the method comprising the steps of:
- receiving a traffic message comprising an event and a location to which the event relates,
- evaluating the traffic message in order to decide whether the traffic message is to be presented, and
- if so decided, presenting the traffic message to the driver.

Such a navigation system and method are known from U.S. Pat. No. 5,095,532. The known system receives traffic messages according to the Radio Data System (RDS). In RDS, the message is broadcast together with the audio signals of a radio program and the RDS receiver in the vehicle is equipped to receive the combined signals and to separate the message from the audio. The traffic message comprises an event, describing the particular circumstances to which the message relates, and a location, indicating the position on the road where the event takes place. In the known system, the driver inputs the route that he plans to follow during a trip and the system stores this route. When a message has been received, the known system determines whether this received message concerns a location on the planned route. If this is the case, then the message is further processed and its content is presented to the driver. This filtering is employed to reduce the potentially high number of traffic messages so as to not overwhelm the driver with traffic messages. A disadvantage of the known system is that it is necessary to input and store the planned route. Furthermore, the filtering of traffic messages in the known system has a problem in that traffic messages not directly related to the planned route are discarded by the system.

It is an object of the invention to provide a navigation system of the kind set forth with an improved filtering of traffic messages. This object is achieved according to the invention in a navigation system that is characterised in that the filter module is operative:
- to determine a delay on the basis of the event in the traffic message and
- to either transfer the traffic message to the process module if the delay is larger than a predetermined threshold or to discard the traffic message if the delay is not larger than the predetermined threshold. Since the navigation system according to the invention filters traffic messages on the basis of a minimal delay, it is not necessary to have a planned route input by the driver and stored in the system. The navigation system simply determines the delay caused by the particular event and if this is small enough the traffic message is discarded. This reduces the number of traffic messages to be processed by the system and to be presented to the driver. Furthermore, traffic messages involving a long delay but not directly related to the planned route are not discarded but are processed by the system. This may be of importance in case the driver leaves the route and when a new route is planned.

SUMMARY OF THE INVENTION

An embodiment of the navigation system according to the invention is defined in claim 2. In a navigation system comprising a map database with information on the location to which the event of the traffic message relates, this information can advantageously be used to determine the delay caused by the event. An example is where the traffic message relates to a traffic queue of a particular length at a particular location and where the information in the map database reveals that the particular location is a bridge in the highway. The filter module may determine that the caused delay is longer than average for the traffic queue of the particular length.

An embodiment of the navigation system according to the invention is defined in claim 4. In a navigation system where traffic messages are presented on a map displayed by the system, it is advantageous to limit the number of displayed messages. Displaying many traffic messages would clutter the display and would be confusing for the driver. According to the invention, only the more important messages, i.e. those involving at least a minimal delay, are displayed.

An embodiment of the navigation system according to the invention is defined in claim 5. The number of traffic messages that must be considered by the planning module of this embodiment is reduced by filtering out traffic messages that do not have a minimal delay. A planning module that is arranged to take into account dynamic traffic information, i.e. received via the traffic messages, in addition to the static information in the system, need not only consider events on the planned route but also events off that route. A traffic message may indicate that a traffic queue at a location not on the route has become less severe. In that case, the planning module has to re-plan the route between the present vehicle position and the destination because the current planned route may no longer be the optimal one. Re-planning a route requires a considerable computational effort and reduction of the number of traffic messages leading to re-planning is therefore advantageous.

It is a further object of the invention to provide a method of the kind set forth with an improved filtering of traffic messages. This object is achieved according to the invention in a method that is characterised in that evaluating the traffic message includes:
- determining a delay on the basis of the event in the traffic message and
- deciding to present the traffic message if the delay is larger than a predetermined threshold or to discard the traffic message if the delay is not larger than the predetermined threshold. By determining the delay of a received traffic message and by only presenting the traffic message if a minimal delay is involved, the number of traffic messages presented to the driver is reduced in a simple way. The driver is not overwhelmed by the potentially large number of traffic messages and the driver will be able to pay adequate attention to the presented, more important traffic messages.

Further advantageous embodiments of the invention are recited in the dependent claims.

Figure 2:
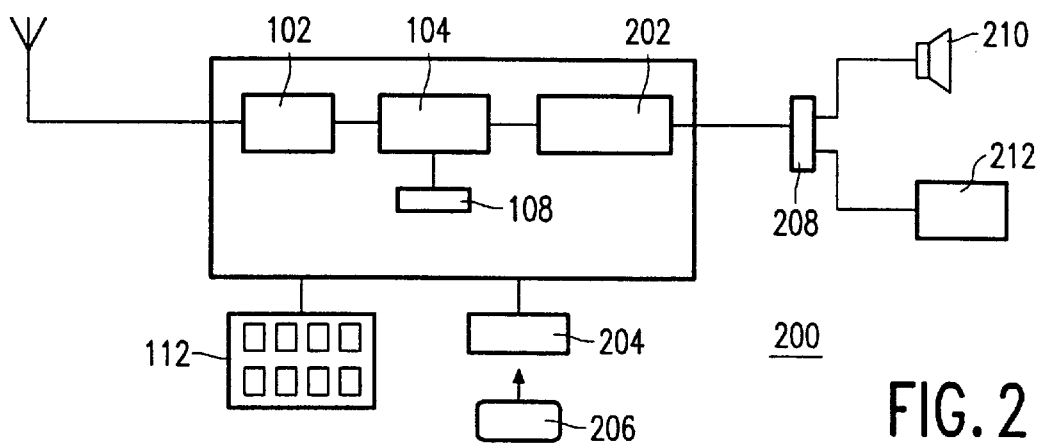
Figure 3:
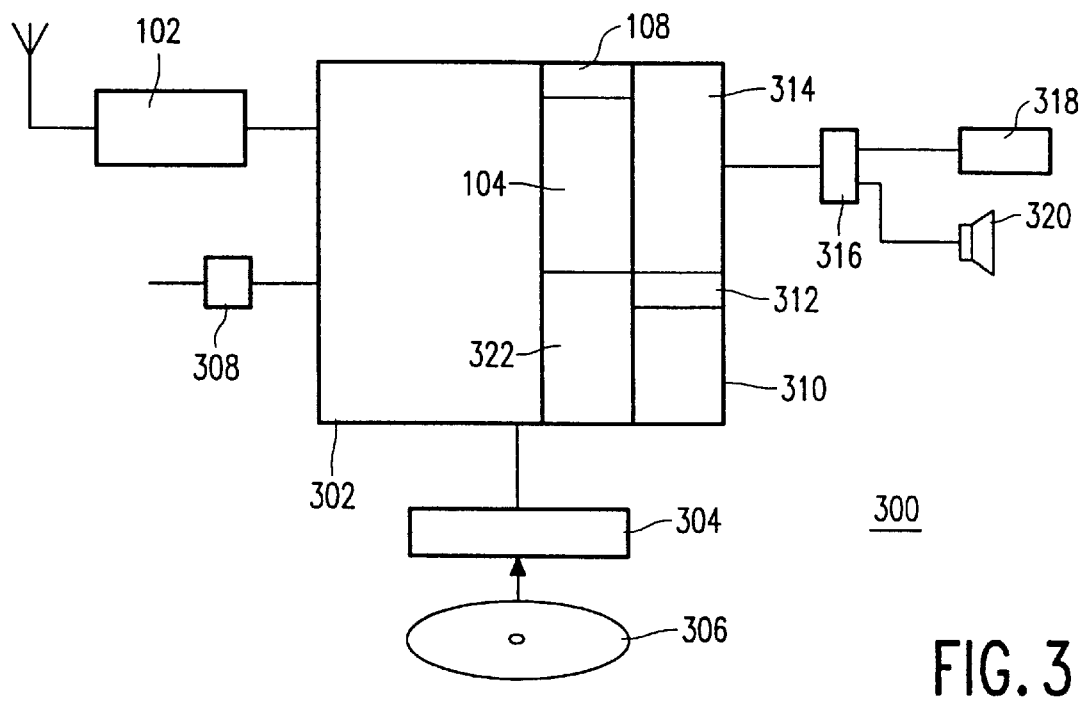

The invention and its attendant advantages will be further elucidated with the aid of exemplary embodiments and the accompanying schematic drawings, whereby:

FIG. 1 schematically shows a navigation system according to the invention,

FIG. 2 shows an embodiment of the navigation system according to the invention presenting the traffic message, and FIG. 3 shows an embodiment of the navigation system according to the invention using a map database.

Corresponding features in the various Figures are denoted by the same reference symbols.

FIG. 1 schematically shows a navigation system according to the invention. The navigation system 100 comprises a receiver 102 for the reception of traffic messages. Such a traffic message includes an event, indicating the happening to which the traffic message relates, and a location where the event occurs. An example of a traffic message is a message indicating a traffic queue of a particular length starting from a particular location on a particular road. In an embodiment, the traffic message is broadcast via RDS as described in U.S. Pat. No. 5,095,532 and its format and contents is conform the standardised Traffic Message Channel (TMC). The event and location are transferred as codes in the traffic message and the meaning of the codes are agreed upon in the standard. The invention is not restricted to RDS TMC and other ways of transmitting the traffic message may be employed, e.g. via the GSM telephone network. The navigation system 100 further comprises a filter module 104 that gets the traffic message from the receiver for evaluation and that decides whether that traffic message is to be processed by the system. If it is to be processed, the traffic message is transferred to process module 106. The filter module 104 determines the delay that a driver will experience when he passes the location to which the traffic message relates. When this delay is not larger than a threshold value stored in storage 108, the filter module will not transfer the message to the process module and the message is discarded. The filter module determines the delay on the basis of the event in the traffic message and may use for this purpose a number rules, stored in storage 108. For example, it may be stored that a traffic queue of 2 kilometres will cause a delay of 10 minutes. In specific cases, the event in the traffic message may itself include an indication of the delay but this is usually not the case. In the navigation system according to the invention, a traffic message that is considered not to be relevant is blocked from the process module and this module is not activated for such a traffic message. This is particularly advantageous where execution of the process module requires a relatively large computational effort compared with the execution of the filter module. The process module 106 processes the traffic message and exploits information in the message concerning the event and the location. The result of the processing module is presented to the user of the navigation system by means of interface 110. Furthermore, the navigation system may include an input device 112 through which the user may enter commands and other input into the system, for instance a value for the threshold stored in storage 108. The input device may be a keyboard separate from the housing of the system or may be a number of keys arranged on that housing or any other mechanism suitable for entering input.

FIG. 2 shows an embodiment of the navigation system according to the invention presenting the traffic message. Navigation system 200 comprises a receiver 102 for the reception of traffic messages and a filter module 104 coupled to the receiver. When the receiver receives a traffic message, the filter module determines the delay of that traffic message and compares this delay with a threshold value stored in storage 108. When the delay is larger than the threshold, the traffic message is passed on to presentation module 202 for presentation to the user of the system. The system comprises a reader 204 for reading a storage medium 206, which can be a memory card. The storage medium comprises the description of the codes that are transmitted in the traffic message. The presentation module uses this description in order to present the traffic message in a way comprehensible to the user. The presentation module outputs the traffic message via interface 208 through a speaker 210 and/or via display 212. The navigation system may include input device 112 for entering a value for the threshold into storage 108. The filter module 104 reduces the number of traffic message that are presented to the user. This prevents overloading the user with traffic messages and enables the user paying adequate attention to important traffic messages.

FIG. 3 shows an embodiment of the navigation system according to the invention using a map database. The system 300 comprises a central unit 302 which controls the operation of the system and which includes various modules for performing specific tasks. The central unit can be implemented on a computer comprising a central processor and working memory loaded with software programs for carrying out the specific tasks. The system 300 has a reader 304 to read information from a map database stored on a data carrier, like a CD-ROM 306. Other types of carrier can also be used, e.g. magnetic disk and IC Card. The map database comprises information on roads of the area to which the particular map relates, e.g. the roads of a country or of a state. In the map database, a chain is used to represent a road element identifying an elementary part of a road. Chains are used to represent the road in a discrete way. Examples of road elements are: a part of the road between two junctions, a part of the road with a certain direction, a part of the road with a certain name, and a part of the road at an intersection. Furthermore, the map database has nodes, representing the begin and end points of a road element. So a chain terminates at a node and a next chain starts at that node, thus forming a network of routes. A node may be a junction between roads, so more than two chains are connected to that node, or may be an intermediate point where two chains are connected. The system 300 is equipped with an interface 308 suitable for receiving information concerning the current position of the vehicle in which the system is employed. This information can be supplied by a position determining system like a GPS receiver, using information broadcast by dedicated satellites. However, the position information can also be determined in another way, for instance using a locating system with one or more distance sensors, for measuring the distance travelled by the vehicle, and a compass, for measuring the heading of the vehicle. The system 300 further comprises a planning module 310 that is suitable to plan a route between an origin, e.g. the current position of the vehicle, and a desired destination. The desired destination is entered into the system in a convenient way, e.g. by entering the post code via a keyboard, by entering road names, by entering co-ordinates or by pointing to a position on a map displayed by the system. The planning module 310 searches through the map database for a route that is optimal according to some criterion. The planning module creates a large number of possible routes, each comprising a number of road elements, between the origin and the desired destination. The criterion can be the travel time, the travel distance, a combination of time and distance, or some other criterion that can be derived from information in the map database. The resulting route, comprising a number of selected chains, is stored in memory space 312 and the driver of the vehicle is given guidance to follow this route. To this end, the system comprises a guidance module 314 and an interface 316 for sending the guidance information to display 318 and/or loudspeaker 320. Providing a driver with guidance to follow a predetermined route is known in the art and is for instance described in U.S. Pat. No. 5,537,323 (PHN 13872). The system 300 may further comprise a display module 322 to display the chains of a section of the map on display 318. This section is displayed in a suitable scale and may indicate the planned route, the current position of the vehicle and the destination.

The system 300 comprises a receiver 102 for the reception of traffic messages and a filter module 104. The filter module determines the delay of a received traffic message and discards the traffic message if the delay is not larger than a threshold value stored in memory space 108. The filter module determines the delay on the basis of the event in the traffic message. To this end, the system has a table that specifies the delay for the possible events in the traffic message. Furthermore, the filter module determines the type of location in the traffic message by consulting the map database of the system. The database comprises a link that specifies what chain is related to a given location. The database further comprises for a chain, the type of the road that is represented by that chain. This type of road for the location to which the message relates plays a role in determining the delay caused by the event in the traffic message. A traffic queue of a given length on a highway causes a shorter delay than a traffic queue with the same length on a secondary road. The mechanism accounting for the type of road may be implemented in different ways. The type of road may be an entry in the table specifying the delay for the different events. Alternatively, the type of road may lead to a scaling factor by which the delay found in the table is multiplied.

In an embodiment of the system of FIG. 3, traffic messages that pass the filter module are presented to the user on display 318 and the system does not further take account of the traffic messages. The events of the traffic messages are displayed on the map that the system draws on display 318. The filter module reduces the number of events that is to be displayed and this prevents a disorder of the map by potentially a large number of events if no filter module would have been used. In a further embodiment of the system of FIG. 3, the planning module exploits the traffic message in planning a route. In this embodiment, the static information residing in the map database is supplemented and updated by the dynamic information received through the traffic messages. When new, dynamic road information is received, the current planned route to the destination may no longer be the optimal route. This may be the case in two situations: if the new information indicates a worse travel condition for a chain on the route ahead or if the new information indicates an improved travel condition for a chain not residing on the route. To cope with the latter situation, the planning module maintains a list of chains that have been considered during the planning process and the dynamic information of these chains. So the planning module first assesses whether the traffic message relates to one of the two situations above and if this is the case, then the planning module must re-plan the route between the present position and the desired destination. The filter module in this further embodiment passes traffic messages to the planning module only if the delay is larger than the predetermined threshold. The advantage is that the planning module, which requires a substantial computational effort, is invoked less frequently by the system. Furthermore, it is advantageous that the user of the navigation system is not too often confronted with new planned routes for which only a small improvement may be expected.

What is claimed is:

1. A navigation system for guiding a driver of a vehicle on a route, the navigation system comprising:
    a receiver for the reception of a traffic message, the traffic message comprising an event and a location to which the event relates,
    a filter module for a evaluating the traffic message and for deciding whether the traffic message is to be processed, and
    a process module for processing and exploiting the traffic message, wherein the filter module is operative:
        to determine a delay on the basis of the event in the traffic message and
        to either transfer the traffic message to the process module if the delay is larger than a predetermined threshold or to discard the traffic message if the delay is not larger than the predetermined message, and wherein the decision to transfer the traffic message does not depend on the route of the vehicle.

2. A navigation system as claimed in claim 1, comprising a map database including one or more properties of the location in the traffic message and wherein the filter module is operative to determine the delay on the basis of at least one of the properties of the location in the traffic message.

3. A navigation system as claimed in claim 1, wherein the receiver is suitable for the reception of RDS TMC traffic messages.

4. A navigation system as claimed in claim 1, comprising a display for displaying a map, wherein the process module includes a display module for displaying a representation of the event of the traffic message on the displayed map.

5. A navigation system as claimed in claim 1, wherein the process module includes a planning module for planning a route between an origin and a destination on the basis of the event and the location of the traffic message.

6. A navigation system as claimed in claim 1, comprising an input device allowing the driver to input a value for the predetermined threshold.

7. A method of giving guidance information to a driver of a vehicle on a route, the method comprising:
    receiving a traffic message comprising an event and a location to which the event relates,
    evaluating the traffic message independent of the route of the vehicle in order to decide whether the traffic message is to be presented, and
    if so decided, presenting the traffic message to the driver, wherein evaluating the traffic message includes:
        determining a delay on the basis of the event in the traffic message and
        deciding to present the traffic message if the delay is larger than a predetermined threshold or to discard the traffic message if the delay is not larger than the predetermined threshold.

8. A navigation system for guiding a driver of a vehicle on a route, the navigation system comprising:
    a receiver which receives a traffic message with data containing an event and a location to which the event relates;
    a filter module coupled to the receiver which evaluates the traffic message and decides whether the traffic message is to be processed independent of the route traveled by the vehicle, the filter module determining a delay on the basis of the event in the traffic message and transferring the traffic message to the processing module if the delay is larger than a predetermined threshold; and
    a processing module coupled to the filter for processing and exploiting the traffic message.

* * * * *